(12) United States Patent
Dick et al.

(10) Patent No.: US 10,492,154 B2
(45) Date of Patent: Nov. 26, 2019

(54) POWER CONTROL FOR COMMUNICATIONS SYSTEMS UTILIZING HIGH SPEED SHARED CHANNELS (71) Applicant: InterDigital Technology Corporation, Wilmington, DE (US)

(72) Inventors: Stephen G. Dick, Nesconset, NY (US); Marian Rudolf, Montreal (CA)

(73) Assignee: InterDigital Technology Corporation, Wilmington, DE (US)

( * ) Notice: Subject to any disclaimer, the term of this patent is extended or adjusted under 35 U.S.C. 154(b) by 0 days.

(21) Appl. No.: 15/601,489

(22) Filed: May 22, 2017

(65) Prior Publication Data

US 2017/0265152 A1    Sep. 14, 2017

Related U.S. Application Data

(63) Continuation of application No. 14/658,398, filed on Mar. 16, 2015, now Pat. No. 9,661,593, which is a (Continued)

(51) Int. Cl.
*H04W 52/54* (2009.01)
*H04W 52/12* (2009.01)
(Continued)

(52) U.S. Cl.
CPC .......... *H04W 52/54* (2013.01); *H04L 1/1607* (2013.01); *H04L 5/0055* (2013.01);
(Continued)

(58) Field of Classification Search
CPC ... H04W 52/54; H04W 52/221; H04W 52/22; H04W 72/0406; H04L 1/16; H04L 1/1607
See application file for complete search history.

(56) References Cited

U.S. PATENT DOCUMENTS 5,696,766 A   12/1997 Yeung et al.
5,715,521 A   2/1998 Fukasawa et al.
(Continued)

FOREIGN PATENT DOCUMENTS

EP   1 017 187   7/2000
EP   1 039 657   9/2000
(Continued)

OTHER PUBLICATIONS

Association of Radio Industries and Business (ARIB), "Specification of Air-Interface for 3G Mobile System," vol. 3, ver. 1.0, Issued Dec. 1997, Revised Jan. 1999.
(Continued)

*Primary Examiner* — Warner Wong
(74) *Attorney, Agent, or Firm* — Volpe and Koenig, P.C.

(57) ABSTRACT

A method and apparatus are described for controlling transmitter power in a wireless communication system in which channels, including one or more shared channels, are utilized. A wireless transmit/receive unit (WTRU) may receive a control signal from a base station. The WTRU may also receive a transmit power command from the base station. Further, the WTRU may transmit a shared channel signal to another WTRU in a transmission time interval (TTI) based on the control signal. The transmission power level of the transmitted shared channel signal may be based on the received transmit power command. Also, the transmission power level may be further based on a measured pathloss. In addition, the WTRU may transmit a second channel signal to the another WTRU in a TTI, wherein a transmission power level of the transmitted second channel signal is derived from a measured pathloss and a received transmit power command.

20 Claims, 6 Drawing Sheets

Related U.S. Application Data continuation of application No. 14/249,104, filed on Apr. 9, 2014, now Pat. No. 8,983,524, which is a continuation of application No. 10/688,223, filed on Oct. 16, 2003, now Pat. No. 8,738,062.

(60) Provisional application No. 60/419,380, filed on Oct. 17, 2002.

(51) Int. Cl.
| | |
|---|---|
| *H04W 52/14* | (2009.01) |
| *H04W 52/16* | (2009.01) |
| *H04W 52/24* | (2009.01) |
| *H04W 52/26* | (2009.01) |
| *H04W 52/32* | (2009.01) |
| *H04W 52/02* | (2009.01) |
| *H04L 5/00* | (2006.01) |
| *H04L 1/16* | (2006.01) |
| *H04W 52/22* | (2009.01) |
| *H04W 72/04* | (2009.01) |
| *H04W 52/08* | (2009.01) |
| *H04W 52/10* | (2009.01) |

(52) U.S. Cl.
CPC ... *H04W 52/0238* (2013.01); *H04W 52/0245* (2013.01); *H04W 52/12* (2013.01); *H04W 52/146* (2013.01); *H04W 52/16* (2013.01); *H04W 52/221* (2013.01); *H04W 52/241* (2013.01); *H04W 52/265* (2013.01); *H04W 52/267* (2013.01); *H04W 52/325* (2013.01); *H04W 72/0406* (2013.01); *H04W 52/08* (2013.01); *H04W 52/10* (2013.01); *Y02D 70/1222* (2018.01); *Y02D 70/1224* (2018.01); *Y02D 70/1242* (2018.01); *Y02D 70/1244* (2018.01); *Y02D 70/22* (2018.01)

(56) References Cited

U.S. PATENT DOCUMENTS

| | | | |
|---|---|---|---|
| 5,822,359 | A | 10/1998 | Bruckert et al. |
| 5,893,036 | A | 4/1999 | Trandai et al. |
| 6,067,458 | A | 5/2000 | Chen |
| 6,108,374 | A | 8/2000 | Balachandran et al. |
| 6,141,533 | A | 10/2000 | Wilson et al. |
| 6,154,659 | A | 11/2000 | Jalali et al. |
| 6,181,738 | B1 | 1/2001 | Chheda et al. |
| 6,222,832 | B1 | 4/2001 | Proctor |
| 6,285,887 | B1 | 9/2001 | Mimura |
| 6,298,241 | B1 | 10/2001 | Hong |
| 6,301,238 | B1 | 10/2001 | Hagerman et al. |
| 6,307,844 | B1 | 10/2001 | Tsunehara et al. |
| 6,356,538 | B1 | 3/2002 | Li |
| 6,393,276 | B1 | 5/2002 | Vanghi |
| 6,396,867 | B1 | 5/2002 | Tiedemann, Jr. et al. |
| 6,400,960 | B1 | 6/2002 | Dominique et al. |
| 6,434,365 | B1 | 8/2002 | Knutson et al. |
| 6,456,604 | B1 | 9/2002 | Lee et al. |
| 6,466,563 | B1 | 10/2002 | Yamada |
| 6,480,476 | B1 | 11/2002 | Willars |
| 6,529,740 | B1 | 3/2003 | Ganucheau, Jr. et al. |
| 6,587,697 | B2 | 7/2003 | Terry et al. |
| 6,633,558 | B1 | 10/2003 | Cho et al. |
| 6,643,318 | B1 | 11/2003 | Parsa et al. |
| 6,693,951 | B1 | 2/2004 | Gilhousen et al. |
| 6,711,150 | B1 | 3/2004 | Vanghi |
| 6,717,916 | B1 | 4/2004 | Ahn et al. |
| 6,728,551 | B2 | 4/2004 | Chang |
| 6,741,614 | B1 | 5/2004 | Porter et al. |
| 6,754,505 | B1 | 6/2004 | Baker et al. |
| 6,853,844 | B2 | 2/2005 | Iwamura |
| 6,928,066 | B1 | 8/2005 | Moon et al. |
| 7,062,287 | B2 | 6/2006 | Nakamura et al. |
| 7,079,522 | B1 | 7/2006 | Kim et al. |
| 7,342,355 | B2 | 3/2008 | Seo et al. |
| 8,155,096 | B1 | 4/2012 | Proctor, Jr. |
| 8,605,527 | B2 | 12/2013 | Proctor, Jr. et al. |
| 8,605,702 | B2 | 12/2013 | Proctor, Jr. et al. |
| 9,806,850 | B2 * | 10/2017 | Lv ............ H04L 1/0031 |
| 2001/0006898 | A1 | 7/2001 | Bae |
| 2001/0012276 | A1 | 8/2001 | Tsunehara et al. |
| 2001/0026543 | A1 * | 10/2001 | Hwang ........... H04B 7/2628 370/335 |
| 2001/0053140 | A1 | 12/2001 | Choi et al. |
| 2002/0002058 | A1 | 1/2002 | Hamabe |
| 2002/0025811 | A1 | 2/2002 | Willey |
| 2002/0027946 | A1 | 3/2002 | Ozluturk |
| 2002/0027959 | A1 | 3/2002 | Haim |
| 2002/0080024 | A1 | 6/2002 | Nelson, Jr. et al. |
| 2002/0111183 | A1 * | 8/2002 | Lundby .......... H04W 52/08 455/522 |
| 2002/0136192 | A1 | 9/2002 | Holma et al. |
| 2002/0165004 | A1 | 11/2002 | Chen et al. |
| 2003/0027587 | A1 | 2/2003 | Proctor, Jr. |
| 2003/0043778 | A1 * | 3/2003 | Luschi .......... H04L 1/0003 370/349 |
| 2003/0064744 | A1 | 4/2003 | Zhang et al. |
| 2003/0123382 | A1 | 7/2003 | Wang et al. |
| 2003/0228865 | A1 * | 12/2003 | Terry ............ H04W 48/08 455/422.1 |
| 2004/0043784 | A1 | 3/2004 | Czaja et al. |
| 2004/0190475 | A1 | 9/2004 | Hamalainen et al. |
| 2004/0190600 | A1 | 9/2004 | Odenwalder |
| 2004/0190699 | A1 | 9/2004 | Doherty et al. |
| 2005/0003848 | A1 | 1/2005 | Chen et al. |
| 2005/0159176 | A1 | 7/2005 | Uehara et al. |
| 2011/0044221 | A1 | 2/2011 | Proctor, Jr. |
| 2013/0003636 | A1 | 1/2013 | Proctor, Jr. |
| 2016/0234817 | A1 * | 8/2016 | Koyanagi .......... H04L 5/0041 |

FOREIGN PATENT DOCUMENTS

| | | |
|---|---|---|
| EP | 1 126 635 | 8/2001 |
| EP | 1 215 926 | 6/2002 |
| JP | 11-041203 | 2/1999 |
| JP | 2002-280930 | 9/2002 |
| WO | 99/67899 | 12/1999 |
| WO | 00/62456 | 10/2000 |
| WO | 02/009311 | 1/2002 |
| WO | 02/041522 | 5/2002 |
| WO | 02/065667 | 8/2002 |

OTHER PUBLICATIONS

InterDigital, Proposed CR 194 to 25.331 on DPCH Uplink Outer Loop Power Control SIR Setting in TDD Mode, 3GPP TSG-RAN WG2 #11, R2-00358, Torino, Italy, Feb. 28-Mar. 3, 2000.

IPWireless, HS-SICH-Specific SIR target for 3.84Mcps TDD, 3GPP TSG-RAN WG1 #26, Tdoc R1-02-0951, Oulu, Finland, Jul. 2-5, 2002.

Samsung et al., "HS-DPCCH power control using the special pilot bits in HS-DPCCH (Revision of R1-02-0562)," 3GPP TSG-RAN WG1 #25, R1-02-0636, Paris, France, (Apr. 9-12, 2002).

Samsung, "Impact of separate power control of HS-DPCCH on UL DPDCH performance," 3GPP TSG-RAN WG1 #26, R1-02-0764, Gyeongju, Korea (May 13-16, 2002).

Samsung, "UL Power Control for HSDPA," 3GPP TSG-RAN WG1 #23, R1-02-0033, Espoo, Finland (Jan. 8-11, 2002).

Telecommunications Industry Association, "TIA/EIA Interim Standard, Mobile Station-Base Station Compatibility Standard for Dual-Mode Wideband Spread Spectrum Cellular System, TIA/EIA/IS-95-A (Revision of TIA/EIA/IS-95)," (May 1995).

Telecommunications Industry Association, "TIA/EIA Standard, Mobile Station-Base Station Compatibility Standard for Wideband Spread Spectrum Cellular Systems, TIA/EIA-95B (Upgrade and Revision of TIA/EIA-95A)," (Mar. 1999).

Third Generation Partnership Project 2, "cdma2000 High Rate Packet Data Air Interface Specification," 3GPP2 C.50024, Version 2.0 (Oct. 27, 2000).

(56) References Cited

OTHER PUBLICATIONS

Third Generation Partnership Project 2, "Medium Access Control (MAC) Standard for cdma2000 Spread Spectrum Systems," 3GPP2 C.50003-0, Version 1.0 (Oct. 1999).
Third Generation Partnership Project 2, "Medium Access Control (MAC) Standard for cdma2000 Spread Spectrum Systems, Release—Addendum 2," 3GPP2 C.S0003-0, Version 3.0 (Jun. 2001).
Third Generation Partnership Project 2, "Physical Layer Standard for cdma2000 Spread Spectrum Systems," 3GPP2 C.S0002-0, Version 1.0 (Jul. 1999).
Third Generation Partnership Project 2, "Physical Layer Standard for cdma2000 Spread Spectrum Systems," 3GPP2 C.S0002 Version 3.0 (Jul. 2001).
Third Generation Partnership Project 2, "Physical Layer Standard for cdma2000 Spread Spectrum Systems," 3GPP2 C.S0002-0-2 Version 1.13 (Apr. 24, 2001).
Third Generation Partnership Project, "Technical Specification Group Radio Access Network; Radio Resource Control (RRC); Protocol Specification (Release 1999)," 3GPP TS 25.331 V3.12.0 (Sep. 2002).
Third Generation Partnership Project, "Technical Specification Group Radio Access Network; Radio Resource Control (RRC); Protocol Specification (Release 4)," 3GPP TS 25.331 V4.7.0 (Sep. 2002).
Third Generation Partnership Project, "Technical Specification Group Radio Access Network; Radio Resource Control (RRC); Protocol Specification (Release 5)," 3GPP TS 25.331 V5.2.0 (Sep. 2002).
Third Generation Partnership Project, "Technical Specification Group Radio Access Network; Spreading and modulation (TDD) (Release 1999)," 3G TS 25.223 V3.3.0 (Jun. 2000).
Third Generation Partnership Project, "Technical Specification Group Radio Access Network; RLC Protocol Specification (Release 1999)," 3G TS 25.322 V3.2.0 (Mar. 2000).
Third Generation Partnership Project; "Technical Specification Group Radio Access Network, Physical Channels and Mapping of Transport Channels onto Physical Channels (FDD), (Release 1999)," 3GPP TS 25.211 V3.12.0 (Sep. 2002).
Third Generation Partnership Project; "Technical Specification Group Radio Access Network, Physical Channels and Mapping of Transport Channels onto Physical Channels (FDD), (Release 4)," 3GPP TS 25.211 V4.6.0 (Sep. 2002).
Third Generation Partnership Project; "Technical Specification Group Radio Access Network, Physical Channels and Mapping of Transport Channels onto Physical Channels (FDD), (Release 5)," 3GPP TS 25.211 V5.2.0 (Sep. 2002).
Third Generation Partnership Project; "Technical Specification Group Radio Access Network, Physical Channels and Mapping of Transport Channels onto Physical Channels (FDD), (Release 5)," 3GPP TS 25.211 V5.4.0 (Jun. 2003).
Third Generation Partnership Project; "Technical Specification Group Radio Access Network, Physical Channels and Mapping of Transport Channels onto Physical Channels (FDD), (Release 5)," 3GPP TS 25.211 V5.5.0 (Sep. 2003).
Third Generation Partnership Project; "Technical Specification Group Radio Access Network, Physical Layer Procedures (FDD), (Release 1999)," 3GPP TS 25.214 V3.11.0 (Sep. 2002).
Third Generation Partnership Project; "Technical Specification Group Radio Access Network, Physical Layer Procedures (FDD), (Release 1999)," 3GPP TS 25.214 V3.1.2.0 (Mar. 2003).
Third Generation Partnership Project; "Technical Specification Group Radio Access Network, Physical Layer Procedures (FDD), (Release 4)," 3GPP TS 25.214 V4.5.0 (Sep. 2002).
Third Generation Partnership Project; "Technical Specification Group Radio Access Network, Physical Layer Procedures (FDD), (Release 4)," 3GPP TS 25.214 V4.6.0 (Mar. 2003).
Third Generation Partnership Project; "Technical Specification Group Radio Access Network, Physical Layer Procedures (FDD), (Release 5)," 3GPP TS 25.214 V5.2.0 (Sep. 2002).
Third Generation Partnership Project; "Technical Specification Group Radio Access Network, Physical Layer Procedures (FDD), (Release 5)," 3GPP TS 25.214 V5.5.0 (Jun. 2003).
Third Generation Partnership Project; "Technical Specification Group Radio Access Network, Physical Layer Procedures (FDD), (Release 5)" 3GPP TS 25.214 V5.6.0 (Sep. 2003).
Third Generation Partnership Project; "Technical Specification Group Radio Access Network, Physical Channels and Mapping of Transport Channels onto Physical Channels (TDD), (Release 1999)," 3GPP TS 25.221 V3.11.0 (Sep. 2002).
Third Generation Partnership Project; "Technical Specification Group Radio Access Network, Physical Channels and Mapping of Transport Channels onto Physical Channels (TDD), (Release 4)," 3GPP TS 25.221 V4.6.0 (Sep. 2002).
Third Generation Partnership Project; "Technical Specification Group Radio Access Network, Physical Channels and Mapping of Transport Channels onto Physical Channels (TDD), (Release 4)," 3GPP TS 25.221 V4.7.0 (Dec. 2002).
Third Generation Partnership Project; "Technical Specification Group Radio Access Network, Physical Channels and Mapping of Transport Channels onto Physical Channels (TDD), (Release 5)," 3GPP TS 25.221 V5.2.0 (Sep. 2002).
Third Generation Partnership Project; "Technical Specification Group Radio Access Network, Physical Channels and Mapping of Transport Channels onto Physical Channels (TDD), (Release 5)," 3GPP TS 25.221 V5.5.0 (Jun. 2003).
Third Generation Partnership Project; "Technical Specification Group Radio Access Network, Multiplexing and Channel Coding (TDD), (Release 1999)," 3GPP TS 25.222 V3.6.0 (Apr. 2001).
Third Generation Partnership Project; "Technical Specification Group Radio Access Network. Multiplexing and Channel Coding (TDD), (Release 1999)," 3GPP TS 25.222 V3.10.0 (Sep. 2002).
Third Generation Partnership Project; "Technical Specification Group Radio Access Network, Multiplexing and Channel Coding (TDD), (Release 4)," 3GPP TS 25.222 V4.5.0 (Sep. 2002).
Third Generation Partnership Project; "Technical Specification Group Radio Access Network, Multiplexing and Channel Coding (TDD), (Release 4)," 3GPP TS 25.222 V4.6.0 (Dec. 2002).
Third Generation Partnership Project; "Technical Specification Group Radio Access Network, Multiplexing and Channel Coding (TDD), (Release 5)," 3GPP TS 25.222 V5.2.0 (Sep. 2002).
Third Generation Partnership Project; "Technical Specification Group Radio Access Network, Multiplexing and Channel Coding (TDD), (Release 5)," 3GPP TS 25.222 V5.5.0 (Jun. 2003).
Third Generation Partnership Project; "Technical Specification Group Radio Access Network, Spreading and Modulation (TDD), (Release 1999)," 3GPP TS 25.223 V3.5.0, (Apr. 2001).
Third Generation Partnership Project; "Technical Specification Group Radio Access Network, Spreading and Modulation (TDD), (Release 1999)," 3GPP TS 25.223 V3.8.0 (Mar. 2002).
Third Generation Partnership Project; "Technical Specification Group Radio Access Network, Spreading and Modulation (TDD), (Release 4)," 3GPP TS 25.223 V4.4.0 (Mar. 2002).
Third Generation Partnership Project; "Technical Specification Group Radio Access Network, Spreading and Modulation (TDD), (Release 4)," 3GPP TS 25.223 V4.5.0 (Dec. 2002).
Third Generation Partnership Project; "Technical Specification Group Radio Access Network, Spreading and Modulation (TDD), (Release 5)," 3GPP TS 25.223 V5.1.0 (Jun. 2002).
Third Generation Partnership Project; "Technical Specification Group Radio Access Network, Spreading and Modulation (TDD), (Release 5)," 3GPP TS 25.223 V5.3.0 (Mar. 2003).
Third Generation Partnership Project; "Technical Specification Group Radio Access Network, Physical Layer Procedures (TDD), (Release 1999)," 3GPP TS 25.224 V3.11.0 (Sep. 2002).
Third Generation Partnership Project; "Technical Specification Group Radio Access Network, Physical Layer Procedures (TDD), (Release 1999)," 3GPP TS 25.224 V3.13.0 (Sep. 2003).
Third Generation Partnership Project; "Technical Specification Group Radio Access Network, Physical Layer Procedures (TDD), (Release 4)," 3GPP TS 25.224 V4.6.0 (Sep. 2002).
Third Generation Partnership Project; "Technical Specification Group Radio Access Network, Physical Layer Procedures (TDD), (Release 4)," 3GPP TS 25.224 V4.9.0 (Sep. 2003).

(56) References Cited

OTHER PUBLICATIONS

Third Generation Partnership Project; "Technical Specification Group Radio Access Network, Physical Layer Procedures (TDD), (Release 5)," 3GPP TS 25.224 V5.2.0 (Sep. 2002).
Third Generation Partnership Project; "Technical Specification Group Radio Access Network, Physical Layer Procedures (TDD), (Release 5)," 3GPP TS 25.224 V5.5.0 (Jun. 2003).
Third Generation Partnership Project; "Technical Specification Group Radio Access Network, Physical Layer Procedures (TDD), (Release 5)," 3GPP TS 25.224 V5.6.0 (Sep. 2003).
Third Generation Partnership Project; "Technical Specification Group Radio Access Network; Radio Resource Control (RRC) protocol specification (Release 1999)," 3GPP TS 25.331 V3.16.0 (Sep. 2003).
Third Generation Partnership Project; "Technical Specification Group Radio Access Network;Radio Resource Control (RRC); Protocol Specification (Release 4)," 3GPP TS 25.331 V4.11.0 (Sep. 2003).
Third Generation Partnership Project; "Technical Specification Group Radio Access Network; Radio Resource Control (RRC); Protocol Specification (Release 5)," 3GPP TS 25.331 V5.6.0 (Sep. 2003)
Third Generation Partnershp Project, "Technical Specification Group Radio Access Network; Physical Layer Procedures (TDD) (Release 1999)," 3GPP TS 25.224 V3.6.0 (Mar. 2001).
TIA/EIA Interim Standard, Physical Layer Standard for cdma2000 Spread Spectrum Systems, TIA/EIA/IS-2000-2 (Aug. 1999).
IP Wireless, "HS-SICH-Specific SIR target for 3.84Mcps TDD," 3GPP TSG-RAN WG1#26, R1-02-0951, Oulu, Finland (Jul. 2-5, 2002).

* cited by examiner

POWER CONTROL FOR COMMUNICATIONS SYSTEMS UTILIZING HIGH SPEED SHARED CHANNELS

CROSS-REFERENCE TO RELATED APPLICATIONS

This application is a continuation of U.S. patent application Ser. No. 14/658,398 filed Mar. 16, 2015, which issued as U.S. Pat. No. 9,661,593 on May 23, 2017, which is a continuation of U.S. patent application Ser. No. 14/249,104 filed Apr. 9, 2014, which issued as U.S. Pat. No. 8,983,524 on Mar. 17, 2015, which is a continuation of U.S. patent application Ser. No. 10/688,223 filed Oct. 16, 2003, which issued as U.S. Pat. No. 8,738,062 on May 27, 2014, which claims the benefit of U.S. Provisional Application Ser. No. 60/419,380 filed Oct. 17, 2002, the contents of which are hereby incorporated by reference herein.

FIELD OF THE INVENTION

The present invention relates to methods and apparatus for power control in wireless communication systems and, in particular, systems which use high speed shared channels.

BACKGROUND

Wireless telecommunication systems are well known in the art. In order to provide global connectivity for wireless systems, standards have been developed and are being implemented. One current standard in widespread use is known as Global System for Mobile Telecommunications (GSM). This is considered as a so-called Second Generation mobile radio system standard (2G) and was followed by its revision (2.5G). GPRS and EDGE are examples of 2.5G technologies that offer relatively high speed data service on top of (2G) GSM networks. Each one of these standards sought to improve upon the prior standard with additional features and enhancements. In January 1998, the European Telecommunications Standard Institute-Special Mobile Group (ETSI SMG) agreed on a radio access scheme for Third Generation Radio Systems called Universal Mobile Telecommunications Systems (UMTS). To further implement the UMTS standard, the Third Generation Partnership Project (3GPP) was formed in December 1998. 3GPP continues to work on a common third generational mobile radio standard.

Figure 1:
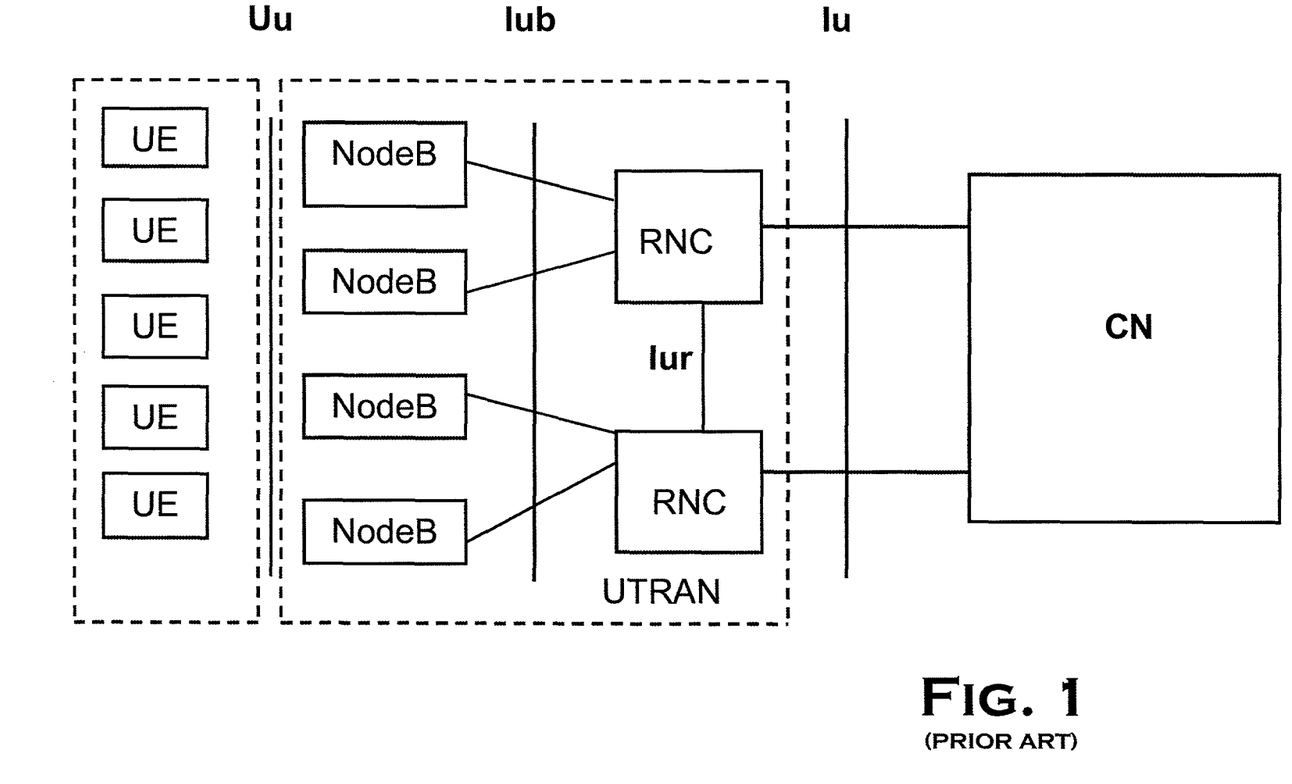
FIG. 1 shows an overview of a system architecture of a conventional UMTS network.

A typical UMTS system architecture in accordance with current 3GPP specifications is depicted in FIG. 1. The UMTS network architecture includes a Core Network (CN) interconnected with a UMTS Terrestrial Radio Access Network (UTRAN) via an interface known as Iu which is defined in detail in the current publicly available 3GPP specification documents. The UTRAN is configured to provide wireless telecommunication services to users through wireless transmit receive units (WTRUs), known as User Equipments (UEs) in 3GPP, via a radio interface known as Uu. The UTRAN has one or more Radio Network Controllers (RNCs) and base stations, known as Node Bs in 3GPP, which collectively provide for the geographic coverage for wireless communications with UEs. One or more Node Bs are connected to each RNC via an interface known as Iub in 3GPP. The UTRAN may have several groups of Node Bs connected to different RNCs; two are shown in the example depicted in FIG. 1. Where more than one RNC is provided in a UTRAN, inter-RNC communication is performed via an Iur interface.

Communications external to the network components are performed by the Node Bs on a user level via the Uu interface and the CN on a network level via various CN connections to external systems.

In general, the primary function of base stations, such as Node Bs, is to provide a radio connection between the base stations' network and the WTRUs. Typically a base station emits common channel signals allowing non-connected WTRUs to become synchronized with the base station's timing. In 3GPP, a Node B performs the physical radio connection with the UEs. The Node B receives signals over the Iub interface from the RNC that control the radio signals transmitted by the Node B over the Uu interface.

A CN is responsible for routing information to its correct destination. For example, the CN may route voice traffic from a UE that is received by the UMTS via one of the Node Bs to a public switched telephone network (PSTN) or packet data destined for the Internet. In 3GPP, the CN has six major components: 1) a serving General Packet Radio Service (GPRS) support node; 2) a gateway GPRS support node; 3) a border gateway; 4) a visitor location register; 5) a mobile services switching center; and 6) a gateway mobile services switching center. The serving GPRS support node provides access to packet switched domains, such as the Internet. The gateway GPRS support node is a gateway node for connections to other networks. All data traffic going to other operator's networks or the internet goes through the gateway GPRS support node. The border gateway acts as a firewall to prevent attacks by intruders outside the network on subscribers within the network realm. The visitor location register is a current serving networks 'copy' of subscriber data needed to provide services. This information initially comes from a database which administers mobile subscribers. The mobile services switching center is in charge of 'circuit switched' connections from UMTS terminals to the network. The gateway mobile services switching center implements routing functions required based on current location of subscribers. The gateway mobile services also receives and administers connection requests from subscribers from external networks.

The RNCs generally control internal functions of the UTRAN. The RNCs also provides intermediary services for communications having a local component via a Uu interface connection with a Node B and an external service component via a connection between the CN and an external system, for example overseas calls made from a cell phone in a domestic UMTS.

Typically a RNC oversees multiple base stations, manages radio resources within the geographic area of wireless radio service coverage serviced by the Node Bs and controls the physical radio resources for the Uu interface. In 3GPP, the Iu interface of an RNC provides two connections to the CN: one to a packet switched domain and the other to a circuit switched domain. Other important functions of the RNCs include confidentiality and integrity protection.

Figure 2:
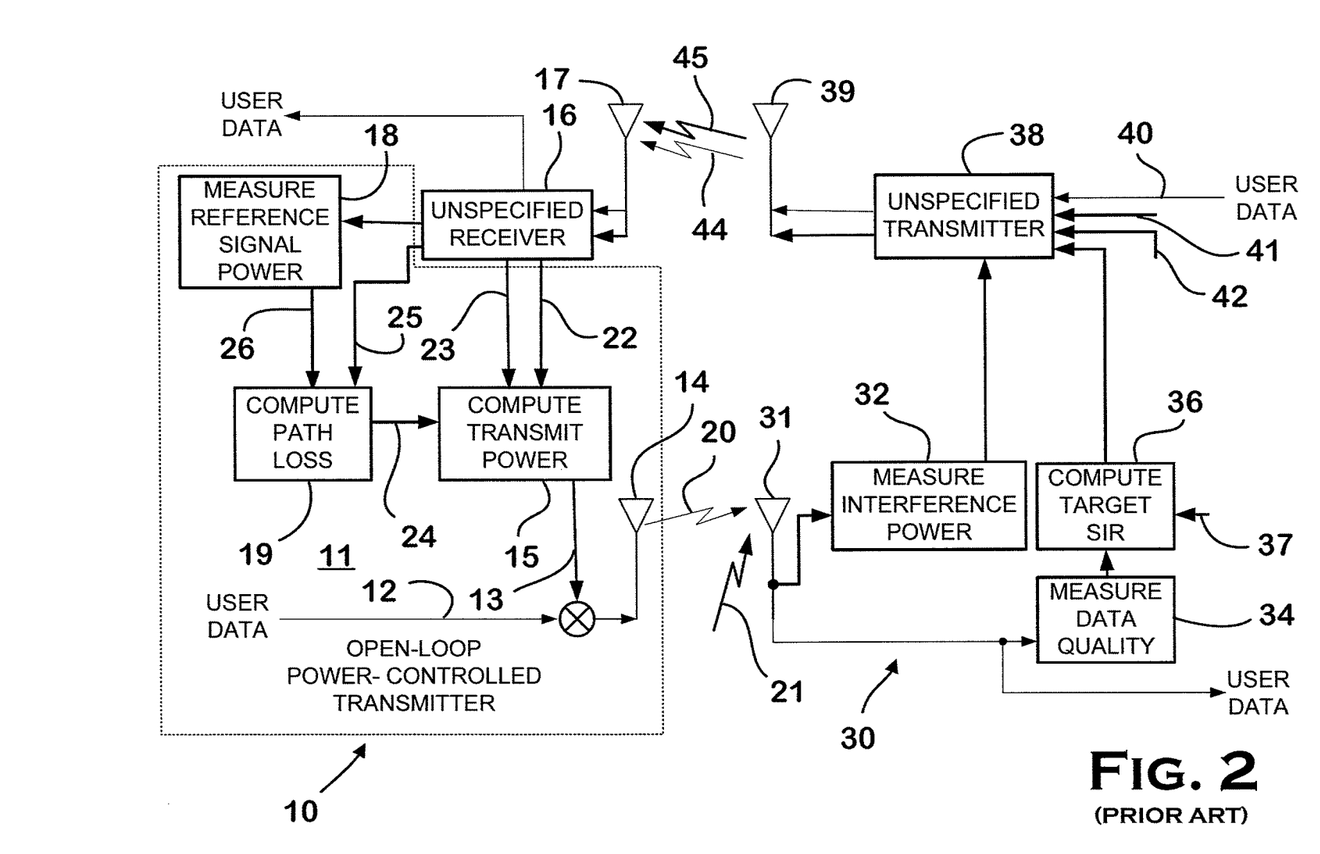
FIG. 2 is a schematic diagram of a conventional open loop power control system for a wireless communication system which implements outer loop power control via a target SIR metric.
Figure 3:
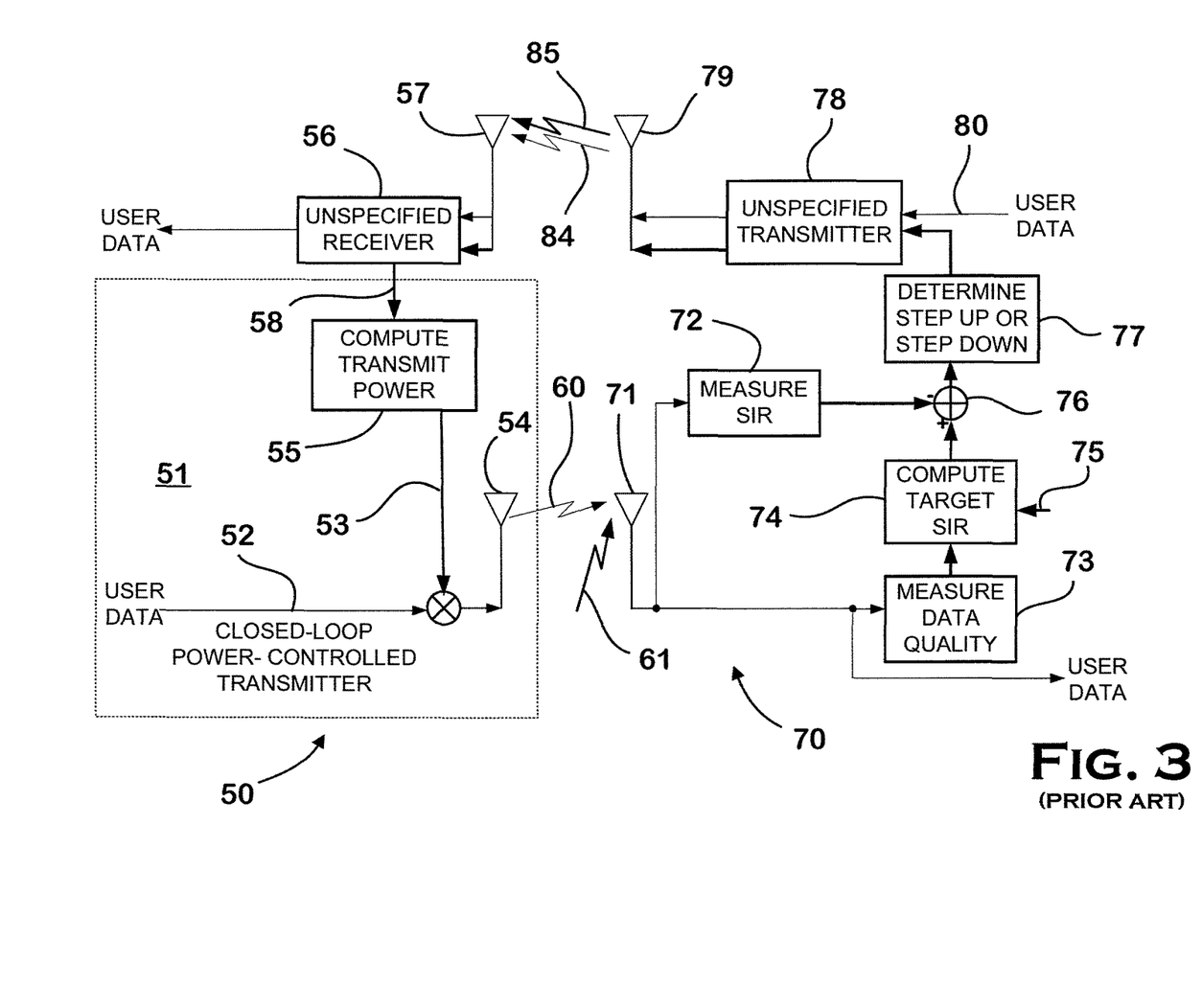
FIG. 3 is a schematic diagram of a conventional closed loop power control system for a wireless communication system which implements outer loop power control via a target SIR metric.

Various methods of power control for wireless communication systems are well known in the art. Examples of open and closed loop power control transmitter systems for wireless communication systems are illustrated in FIGS. 2 and 3, respectively. The purpose of such systems is to rapidly vary transmitter power in the presence of a fading propagation channel and time-varying interference to minimize transmitter power while insuring that data is received at the remote end with acceptable quality.

In communication systems such as Third Generation Partnership Project (3GPP) Time Division Duplex (TDD) and Frequency Division Duplex (FDD) systems, multiple shared and dedicated channels of variable rate data are combined for transmission. Background specification data for such systems are found at 3GPP TS 25.223 v3.3.0, 3GPP TS 25.222 v3.2.0, 3GPP TS 25.224 v3.6 and Volume 3 specifications of Air-Interface for 3G Multiple System Version 1.0, Revision 1.0 by the Association of Radio Industries Businesses (ARIB). A fast method and system of power control adaptation for data rate changes resulting in more optimal performance is taught in International Publication Number WO 02/09311 A2, published 31 Jan. 2002 and corresponding U.S. patent application Ser. No. 09/904,001, filed Jul. 12, 2001 owned by the assignee of the present invention.

Where shared channels are utilized, different WTRUs can use the same channel and channel use by a particular WTRU can be sporadic. The inventors have recognized that the metric used for adjusting power control in the conventional manner for a specific shared channel may not be readily available since the relative position of the WTRU may have substantially changed from when it last used the specific shared channel. Accordingly, it is desirable to provide method and apparatus for controlling the power of shared channels where there may be sporadic use of such channels by WTRUs.

For example, the physical channels specified in 3GPP Release 5 (R5) of UMTS Terrestrial Radio Access Time Division Duplex (UTRA TDD) include a High Speed Shared Information Channel (HS-SICH) which operates in conjunction with a High Speed Downlink Shared Channel (HS-DSCH). HS-SICH is a fast Uplink (UL) feedback channel used in UTRA TDD R5 for High Speed Down link Packet Access HSDPA operation. The HS-SICH carries a 1-bit Ack/Nack message and a several bit long measurement report from a particular WTRU that received a downlink (DL) transmission on the HS-DSCH.

The HS-DSCH is an HSDPA R5 DL channel used to send packages at very high throughput to users that use scheduling based upon estimated instantaneous channel quality for different users and fast Level 1 (L1) retransmission techniques including hybrid automatic repeat requests (ARQ). Only a single WTRU receives a DL transmission on a HS-DSCH in any given Transmission Time Interval (TTI) which is currently specified as 10 ms for the HS-DSCH. The particular WTRU that receives the transmission acknowledges successful/unsuccessful reception of the DL transmission on the HS-SICH within a specified TTI such that there is a 1:1 correlation between TTIs containing a DL HS-DSCH for a particular WTRU and the TTI containing the WTRU's UL acknowledgement. Preferably, the acknowledgment is sent in the ith TTI following the DL transmission TTI, where i is fixed and greater than 5. Thus in a given TTI, only one WTRU transmits in the UL HS-SICH, but different WTRUs use the UL HS-SICH for acknowledging packet reception in other TTIs, respectively.

As with other UL channels, it is desirable to use a loop type power control by a WTRU for determining the necessary UL transmission power for the HS-SICH. Conventionally, the WTRU can be configured with an open-loop power controlled transmitter as shown in FIG. 2 where the WTRU measures DL path loss and takes into account UL interference levels broadcast or signaled from UTRAN to the WTRUs.

In order to meet certain quality reception targets, a so-called outer loop power control is also preferably implemented in the open loop power control as shown in FIG. 2 where a Tx power adjustment is made in response to a metric such as a target Signal to Interference Ratio (SIR). The target SIR is used to control the reception quality of the signal. A higher target SIR implies better demodulation, but more interference created by other users in the system. A lower target SIR implies lower interference created for other users in the system, but the demodulation quality is lower. Conventionally, the target SIR is dynamically adjusted by the outer loop power control that updates the desired value as a function of interference in the system and quality of the UL channel.

Outer-loop functionality for a WTRU relies on observations of received UL transmissions by a base station such as observing block-error rates (BLER) or received SIRs. If for example the BLER becomes higher than allowed, such as BLER>0.1 in 3GPP R5, and the user data becomes unusable because of too many errors, a higher target SIR is signaled to the WTRU that the WTRU in turn will apply to adjust its transmit power. However, the time-shared nature of shared channels such as the HS-SICH where a particular WTRU only transmits in the channel sporadically makes it very difficult to observe WTRU specific BLER or measured SIR with a frequency to assure consistent outer loop power control.

To ensure system operation and for simplicity, a high target SIR on HS-SICH accommodating the worst case WTRU with the worst case target SIR can be chosen in place of outer loop power control where measurement is made of received UL signals from the particular WTRU. However, the resulting degree of interference makes it difficult to allocate other channels into a Time Slot (TS) containing the HS-SICH. Consequently, resources are wasted. The fact that it is desirable to operate several channels in a TS containing HS-SICH, for resource efficiency, aggravates this problem. Without outer loop power control, code resources in a HS-SICH timeslot are wasted. Generally, if WTRUs cannot achieve reliable UL Tx power on HS-SICH in large cell portions, HSDPA operation in UTRA TDD may be heavily compromised. Thus, it is desirable to provide a mechanism for UTRA TDD that allows accurate updates of WTRU specific target SIR values for HS-SICH operation.

SUMMARY

A method and apparatus are described for controlling transmitter power in a wireless communication system in which channels, including one or more shared channels, are utilized. A wireless transmit/receive unit (WTRU) may receive a control signal from a base station. The WTRU may also receive a transmit power command from the base station. Further, the WTRU may transmit a shared channel signal to another WTRU in a transmission time interval (TTI) based on the control signal. The transmission power level of the transmitted shared channel signal may be based on the received transmit power command. In an example, the shared channel signal may be transmitted sporadically. In another example, the WTRU may receive user data from the base station. Also, the transmission power level may be further based on a measured pathloss. The measured pathloss may be derived from a received power level of a reference signal and a transmission power level of the reference signal.

In addition, the WTRU may transmit a second channel signal to the another WTRU in a TTI, wherein a transmission power level of the transmitted second channel signal is derived from a measured pathloss and a received transmit power command. In an example, the second channel signal may contain a control signal. In another example, the second channel signal may be transmitted sporadically.

A method and apparatus are described for controlling transmitter power in a wireless communication system in which both dedicated and shared channels are utilized. A WTRU may receive a first channel (e.g., downlink shared channel), power commands for a second channel (e.g., dedicated channel) and power commands for a third channel (e.g., uplink shared channel). The WTRU may transmit in a transmission time interval at least one of the second channel and the third channel. Acknowledgments and negative acknowledgements to signals received over the first channel may be sent on the third channel. The WTRU may determine a transmission power level of the second channel in response to the second channel power commands and not the third channel power commands. The WTRU may determine a transmission power level of the third channel in response to the third channel power commands and not the second channel power commands.

In one embodiment, outer loop transmission power control is provided for a wireless communication system in which user data is signaled from a network unit in both shared channels available to unspecified WTRUs and dedicated channels that are assigned for use by a specific WTRU in which the WTRU transmits data signals on an uplink dedicated channel (UL DCH) and sporadically transmits data signals on an associated uplink shared channel (UL SCH). The network unit preferably has a receiver for receiving UL user data from WTRUs on UL DCHs and at least one UL SCH and a processor for computing target metrics for UL DCHs based on the reception of signals transmitted by a WTRU on an UL DCH associated with an UL SCH usable by the WTRU. A shared channel target metric generator is provided that is configured to output a respective UL SCH target metric derived from each computed UL DCH target metric. Each WTRU preferably has a processor which computes transmit power adjustments as a function of target metrics for UL channels. The WTRU processors are preferably configured to compute UL DCH power adjustments for an UL DCH associated with an UL SCH as a function of UL DCH target metrics computed by the network unit based on the reception of signals transmitted by the WTRU on the UL DCH and UL SCH power adjustments for the associated UL SCH as a function of the respective UL SCH target metrics output from the shared channel target metric generator. Each WTRU also has a transmitter operatively associated with the WTRU's processor for transmitting user data on the UL DCH and associated UL SCH at respective power levels corresponding to respective computed UL DCH and UL SCH power adjustments.

Preferably, the target metrics are target signal to interference ratios (SIRs) and the communication system has either open or closed loop transmission power control for WTRU transmissions. The invention is particularly suited, but not limited for implementation in a Universal Mobile Telecommunications System (UMTS), such as a 3GPP R5 system where the SCHs for which SCH target SIRs are generated are High Speed Shared Information Channels (HS-SICHs) which operate in conjunction with High Speed Downlink Shared Channels (HS-DSCHs).

As one alternative, the network unit includes the shared channel target metric generator. In that case, for an open loop system, the network unit preferably includes a transmitter configured to transmit DCH and SCH target SIRs and the WTRUs each preferably include a receiver configured to receive respective DCH and SCH target SIRs such that the WTRU's processor computes power adjustments based on received DCH and SCH target SIRs.

For a closed loop system in which the network unit includes the shared channel target metric generator, the network unit preferably includes a component configured to produce DCH and SCH power step commands as a function DCH target SIRs computed by the network unit's processor and SCH target SIRs generated by the shared channel target metric generator and a transmitter configured to transmit DCH and SCH power step commands. The WTRUs then each preferably include a receiver configured to receive respective DCH and SCH power step commands such that the WTRU's processor computes power adjustments based on received DCH and SCH power step commands.

In another alternative, each WTRU includes a shared channel target metric generator where the target metrics are target signal to interference ratios (SIRs). Where the communication system has open loop transmission power control for WTRU transmission, the network unit then preferably includes a transmitter configured to transmit DCH target SIRs and each WTRU include a receiver configured to receive respective DCH target SIRs such that the WTRU's processor computes power adjustments based on received DCH target SIRs and SCH target SIRs generated by the WTRU's shared channel target metric generator based on received DCH target SIRs.

The invention provides a serving wireless transmit receive unit (WTRU) for implementing transmission power control for other WTRUs where user data is signaled to the serving WTRU by the other WTRUs in both up link (UL) shared channels available to unspecified WTRUs and dedicated UL channels that are assigned for use by a specific WTRU in which the specific WTRU transmits data signals on an uplink dedicated channel (UL DCH) and sporadically transmits data signals on an associated uplink shared channel (UL SCH) and where the other WTRUs each include a processor which computes UL channel power adjustments for an UL DCH and an associated UL SCH as a function of UL target metrics computed by the serving WTRU. The serving WTRU preferably includes a receiver for receiving UL user data from other WTRUs on UL DCHs and at least one UL SCH, a processor for computing target metrics for UL DCHs based on the reception of signals transmitted by a WTRU on an UL DCH associated with an UL SCH usable by the WTRU, and a shared channel target metric generator configured to output a respective UL SCH target metric derived from each computed UL DCH target metric.

Preferably, the target metrics are target signal to interference ratios (SIRs). Where the serving WTRU is for use in a Universal Mobile Telecommunications System (UMTS), it is preferably configured as a UMTS Terrestrial Radio Access Network (UTRAN) that has either open or closed loop transmission power control for WTRU transmissions and the SCHs for which SCH target SIRs are generated are High Speed Shared Information Channels (HS-SICHs) which operate in conjunction with High Speed Downlink Shared Channels (HS-DSCHs). For an open loop system, the UTRAN preferably includes a transmitter configured to transmit DCH and HS-SICH target SIRs whereby the other WTRUs compute power adjustments based on DCH and HS-SICH target SIRs received from the UTRAN transmitter. For a closed loop system, the UTRAN preferably includes a component configured to produce DCH and HS-SICH power step commands as a function DCH target SIRs computed by the processor and HS-SICH target SIRs generated by the shared channel target metric generator and a transmitter configured to transmit DCH and HS-SICH power step commands whereby the other WTRUs compute power adjustments based on DCH and HS-SICH power step commands received from the UTRAN's transmitter.

The invention also provides a wireless transmit receive unit (WTRU) having a transmission power control for a wireless communication system in which user data is signaled in both shared channels available to unspecified WTRUs and dedicated channels that are assigned for use by a specific WTRU in which the WTRU transmits data signals on an uplink dedicated channel (UL DCH) and sporadically transmits data signals on an associated uplink shared channel (UL SCH). As such, the WTRU preferably includes a receiver for receiving target metrics for the UL DCH that have been computed based on the reception of signals transmitted by the WTRU on the UL DCH, a shared channel target metric generator configured to output UL SCH target metrics derived from received UL DCH target metrics and a processor which computes power adjustments as a function of target metrics configured to compute UL DCH power adjustments as a function of the received UL DCH target metric and UL SCH power adjustments as a function of UL SCH target metrics output from the shared channel target metric generator. Preferably, the target metrics are target signal to interference ratios (SIRs), so that the processor computes power adjustments based on received DCH target SIRs and SCH target SIRs generated by the WTRU's shared channel target metric generator based on received DCH target SIRs. Preferably, the processor is operatively associated with a transmitter having a combiner configured to combine the computed UL DCH power adjustments with the UL DCH transmission data signals for transmission by the WTRU and a combiner configured to combine the computed UL SCH power adjustments with the UL SCH transmission data signals for transmission by the WTRU.

The WTRU can be advantageously configured for use in a Universal Mobile Telecommunications System (UMTS) that has open loop transmission power control for WTRU transmissions in which the SCHs for which SCH target SIRs are generated are High Speed Shared Information Channels (HS-SICHs) which operate in conjunction with High Speed Downlink Shared Channels (HS-DSCHs). In such case, the processor preferably computes power adjustments based on received DCH target SIRs and HS-SICH target SIRs generated by the WTRU's shared channel target metric generator based on received DCH target SIRs. Also, the processor is preferably operatively associated with a transmitter having a combiner configured to combine the computed UL DCH power adjustments with the UL DCH transmission data signals for transmission by the WTRU and a combiner configured to combine the computed UL HS-SICH power adjustments with the UL HS-SICH transmission data signals for transmission by the WTRU.

Methods of outer loop transmission power control are provided for a wireless communication system in which user data is signaled in both shared channels available to unspecified wireless transmit receive units (WTRUs) and dedicated channels that are assigned for use by a specific WTRU in which the WTRU transmits data signals on an uplink dedicated channel (UL DCH) and sporadically transmits data signals on an associated uplink shared channel (UL SCH). In one method, UL user data is received from WTRUs on UL DCHs and at least one UL SCH and target metrics are computed for UL DCHs based on the reception of signals transmitted by a WTRU on an UL DCH associated with an UL SCH usable by the WTRU by a network unit. A respective UL SCH target metric is derived from each computed UL DCH target metric. UL DCH power adjustments for an UL DCH associated with an UL SCH are computed by each WTRU as a function of UL DCH target metrics computed by the network unit based on the reception of signals transmitted by the WTRU on the UL DCH. UL SCH power adjustments for the associated UL SCH are computed by each WTRU as a function of the respective UL SCH target metrics output from the shared channel target metric generator. User data on the UL DCH and associated UL SCH is transmitted by each WTRU at respective power levels corresponding to computed respective UL DCH and UL SCH power adjustments. The respective UL SCH target metrics can be derived from each computed UL DCH target metric by either the network unit or the WTRUs. Preferably, the target metrics are target signal to interference ratios (SIRs). Also the outer loop power control methods can be implemented for either open or closed loop transmission power control for WTRU transmissions. The methods can be advantageously implemented in a Universal Mobile Telecommunications System (UMTS) where the network unit is a UMTS Terrestrial Radio Access Network (UTRAN) and the SCHs for which SCH target SIRs are generated are High Speed Shared Information Channels (HS-SICHs) which operate in conjunction with High Speed Downlink Shared Channels (HS-DSCHs).

The invention includes a method for implementing transmission power control by a serving wireless transmit receive unit (WTRU) for other WTRUs where user data is signaled to the serving WTRU by the other WTRUs in both up link (UL) shared channels available to unspecified WTRUs and dedicated UL channels that are assigned for use by a specific WTRU in which the specific WTRU transmits data signals on an uplink dedicated channel (UL DCH) and sporadically transmits data signals on an associated uplink shared channel (UL SCH) and where the other WTRUs each compute UL channel power adjustments for an UL DCH and an associated UL SCH as a function of UL target metrics computed by the serving WTRU. UL user data is received from other WTRUs on UL DCHs and at least one UL SCH. Target metrics for UL DCHs are computed based on the reception of signals transmitted by a WTRU on an UL DCH associated with an UL SCH usable by the WTRU. A respective UL SCH target metric is generated derived from each computed UL DCH target metric. Preferably, the computing and generating of target metrics comprises computing and generating of target signal to interference ratios (SIRs). The method is advantageously implemented in a Universal Mobile Telecommunications System (UMTS) where the serving WTRU is configured as a UMTS Terrestrial Radio Access Network (UTRAN) that implements open or closed loop transmission power control for WTRU transmissions and the SCHs for which SCH target SIRs are generated are High Speed Shared Information Channels (HS-SICHs) which operate in conjunction with High Speed Downlink Shared Channels (HS-DSCHs). In an open loop system, DCH and HS-SICH target SIRs are preferably transmitted whereby the other WTRUs compute power adjustments based on DCH and HS-SICH target SIRs received from the UTRAN. In a closed loop system, DCH and HS-SICH power step commands are preferably produced as a function DCH target SIRs and HS-SICH target SIRs and DCH and HS-SICH power step commands are transmitted whereby the other WTRUs compute power adjustments based on DCH and HS-SICH power step commands received from the UTRAN.

Also provided is a method of transmission power control for a wireless transmit receive unit (WTRU) used in a wireless communication system in which user data is signaled in both shared channels available to unspecified WTRUs and dedicated channels that are assigned for use by a specific WTRU in which the WTRU transmits data signals on an uplink dedicated channel (UL DCH) and sporadically transmits data signals on an associated uplink shared channel (UL SCH). Target metrics for the UL DCH are received that have been computed based on the reception of signals transmitted by the WTRU on the UL DCH. UL SCH target metrics are generated derived from received UL DCH target metrics. UL DCH power adjustments are computed as a function of the received UL DCH target metric and UL SCH power adjustments are computed as a function of UL SCH target metrics. Preferably, the target metrics are target signal to interference ratios (SIRs), so that the WTRU computes power adjustments based on received DCH target SIRs and SCH target SIRs generated by the WTRU based on received DCH target SIRs and the WTRU combines the computed UL DCH power adjustments with the UL DCH transmission data signals for transmission by the WTRU and combines the computed UL SCH power adjustments with the UL SCH transmission data signals for transmission by the WTRU. The method can be advantageously implemented for use in a Universal Mobile Telecommunications System (UMTS) that implements open loop transmission power control for WTRU transmissions. In such case, the SCHs for which SCH target SIRs are generated are preferably High Speed Shared Information Channels (HS-SICHs) which operate in conjunction with High Speed Downlink Shared Channels (HS-DSCHs), wherein the WTRU computes power adjustments based on received DCH target SIRs and HS-SICH target SIRs generated by the WTRU based on received DCH target SIRs, combines the computed UL DCH power adjustments with the UL DCH transmission data signals for transmission by the WTRU and combines the computed UL HS-SICH power adjustments with the UL HS-SICH transmission data signals for transmission by the WTRU.

Other objects and advantages will be apparent to those of ordinary skill in the art based upon the following description of presently preferred embodiments of the invention.

TABLE OF ACRONYMS

| | |
|---|---|
| 2G | second generation mobile radio system standard |
| 3GPP | third generation partnership project |
| ARIB | association of radio industries businesses |
| ARQ | automatic repeat request |
| BLER | block error rate |
| CN | core network |
| DCH | dedicated channel |
| DL | downlink |
| ETSI SMG | European telecommunications standard institute - special mobile group |
| FDD | frequency division duplex |
| GPRS | general packet radio service |
| GSM | global system for mobile telecommunications |
| HS | high speed |
| HSDPA | high speed down link packet access |
| HS-DSCH | high speed downlink shared channel |
| HS-SICH | high speed shared information channel |
| L1 | level 1 |
| PSTN | public switched telephone network |
| R5 | release 5 |
| RNCs | radio network controllers |
| RRC | radio resource control |
| SIR | signal to interference ratio |
| TDD | time-division duplex |
| TS | time slot |
| TTI | transmission time interval |
| Tx | transmission |
| UEs | user equipments |
| UL | uplink |
| UL DCH | uplink dedicated channel |
| UL SCH | uplink shared channel |
| UMTS | universal mobile telecommunication system |
| UTRA TDD | UMTS terrestrial radio access time division duplex |
| UTRAN | UMTS terrestrial radio access network |
| WTRUs | wireless transmit receive units |

DETAILED DESCRIPTION OF THE PREFERRED EMBODIMENT(S)

Conventional power control methods for wireless systems such as 3GPP utilize so-called inner and outer loops. The power control system is referred to as either open or closed dependent upon whether the inner loop is open or closed. The outer loops of both types of systems are closed loops.

Pertinent portions of an open loop power control system having a "transmitting" communication station 10 and a "receiving" communication station 30 are shown in FIG. 2. Both stations 10, 30 are transceivers. Typically one is a base station, called a Node B in 3GPP, and the other a type of WTRU, called a user equipment UE in 3GPP. For clarity, only selected components are illustrated and the invention is described in terms of a preferred 3GPP system, but the invention has application to wireless communication systems in general, even such systems that perform ad hoc networking where WTRUs communicate between themselves. Power control is important to maintain quality signaling for multiple users without causing excessive interference.

The transmitting station 10 includes a transmitter 11 having a data line 12 which transports a user data signal for transmission. The user data signal is provided with a desired power level which is adjusted by applying a transmit power adjustment from an output 13 of a processor 15 to adjust the transmission power level. The user data is transmitted from an antenna system 14 of the transmitter 11.

A wireless radio signal 20 containing the transmitted data is received by the receiving station 30 via a receiving antenna system 31. The receiving antenna system will also receive interfering radio signals 21 which impact on the quality of the received data. The receiving station 30 includes an interference power measuring device 32 to which the received signal is input which device 32 outputs measured interference power data. The receiving station 30 also includes a data quality measuring device 34 into which the received signal is also input which device 34 produces a data quality signal. The data quality measuring device 34 is coupled with a processing device 36 which receives the signal quality data and computes target signal to interference ratio (SIR) data based upon a user defined quality standard parameter received through an input 37.

The receiving station 30 also includes a transmitter 38 which is coupled with the interference power measuring device 32 and the target SIR generating processor 36. The receiving station's transmitter 38 also includes inputs 40, 41, 42 for user data, a reference signal, and reference signal transmit power data, respectively. The receiving station 30 transmits its user data and the control related data and references signal via an associated antenna system 39.

The transmitting station 10 includes a receiver 16 and an associated receiving antenna system 17. The transmitting station's receiver 16 receives the radio signal transmitted from the receiving station 30 which includes the receiving station's user data 44 and the control signal and data 45 generated by the receiving station 30.

The transmitting station's transmitter's processor 15 is associated with the transmitting station's receiver 16 in order to compute a transmit power adjustment. The transmitter 11 also includes a device 18 for measuring received reference signal power which device 18 is associated with path loss computing circuitry 19.

In order to compute the transmit power adjustment, the processor 15 receives data from a target SIR data input 22 which carries the target SIR data generated by the receiver station's target SIR generating processor 36, an interference power data input 23 which carries the interference data generated by the receiving station's interference power measuring device 32, and a path loss data input 24 which carries a path loss signal that is the output of the path loss computing circuitry 19. The path loss signal is generated by the path loss computing circuitry 19 from data received via a reference signal transmit power data input 25 which carries the reference signal transmit power data originating from the receiving station 30 and a measured reference signal power input 26 which carries the output of the reference signal power measuring device 18 of the transmitter 11. The reference signal measuring device 18 is coupled with the transmitting station's receiver 16 to measure the power of the reference signal as received from the receiving station's transmitter 38. The path loss computing circuitry 19 preferably determines the path loss based upon the difference between the known reference power signal strength conveyed by input 25 and the measured received power strength conveyed by input 26.

Interference power data, reference signal power data and target SIR values are signaled to the transmitting station 10 at a rate significantly lower than the time-varying rate of the propagation channel and interference. The "inner" loop is the portion of the system which relies on the measured interface. The system is considered "open loop" because there is no feedback to the algorithm at a rate comparable to the time-varying rate of the propagation channel and interference indicating how good the estimates of minimum required transmitter power are. If required transmit power level changes rapidly, the system cannot respond accordingly to change the power adjustment in a timely manner.

With respect to the outer loop of the open loop power control system of FIG. 2, at the remote receiver station 30, the quality of the received data is evaluated via the measuring device 34. Typical metrics for digital data quality are bit error rate and block error rate. Computation of these metrics requires data accumulated over periods of time significantly longer than the period of the time-varying propagation channel and interference. For any given metric, there exists a theoretical relationship between the metric and received SIR. When enough data has been accumulated in the remote receiver to evaluate the metric, it is computed and compared with the desired metric (representing a desired quality of service) in processor 36 and an updated target SIR is then output. The updated target SIR is that value (in theory) which applied in the transmitter inner loop would cause the measured metric to converge to the desired value. Finally, the updated target SIR is passed, via the receiving station transmitter 38 and the transmitting station receiver 16, to the transmitter 11 for use in its inner loop. The update rate of target SIR is bounded by the time required to accumulate the quality statistic and practical limits on the signaling rate to the power-controlled transmitter.

With reference to FIG. 3, a communication system having a transmitting station 50 and a receiving station 70 which employs a closed loop power control system is illustrated.

The transmitting station 50 includes a transmitter 51 having a data line 52 which transports a user data signal for transmission. The user data signal is provided with a desired power level which is adjusted by applying a transmit power adjustment from an output 53 of a processor 55 to adjust the power level. The user data is transmitted via an antenna system 54 of the transmitter 51.

A wireless radio signal 60 containing the transmitted data is received by the receiving station 70 via a receiving antenna system 71. The receiving antenna system will also receive interfering radio signals 61 which impact on the quality of the received data. The receiving station 70 includes an interference power measuring device 72 to which the received signal is input which device 72 outputs measured SIR data. The receiving station 70 also includes a data quality measuring device 73 into which the received signal is also input which device 73 produces a data quality signal. The data quality measuring device 73 is coupled with a processor 74 which receives the signal quality data and computes target signal to interference ratio (SIR) data based upon a user defined quality standard parameter received through an input 75.

A combiner 76, preferably a substracter, compares the measured SIR data from the device 72 with the computed target SIR data from the processor 74, preferably by subtracting, to output an SIR error signal. The SIR error signal from the combiner 76 is input to processing circuitry 77 which generates step up/down commands based thereon.

The receiving station 70 also includes a transmitter 78 which is coupled with the processing circuitry 77. The receiving station's transmitter 78 also includes an input 80 for user data. The receiving station 70 transmits its user data and the control related data via an associate antenna system 79.

The transmitting station 50 includes a receiver 56 and an associated receiving antenna system 57. The transmitting station's receiver 56 receives the radio signal transmitted from the receiving station 70 which includes the receiving station's user data 84 and the control data 85 generated by the receiving station.

The transmitting station's transmitter's processor 55 has an input 58 associated with the transmitting station's receiver 16. The processor 55 receives the up/down command signal through input 58 and computes the transmit power adjustments based thereon.

With respect to the inner loop of the closed loop power control system, the transmitting station's transmitter 51 sets its power based upon high-rate "step-up" and "step-down" commands generated by the remote receiving station 70. At the remote receiving station 70, the SIR of the received data is measured by the measuring device 72 and compared with a target SIR value generated by the processor 74 via combiner 76. The target SIR is that value (in theory) which, given that the data is received with that value, results in a desired quality of service. If the measured received SIR is less than the target SIR, a "step-down" command is issued by the processing circuitry 77, via the receiving station's transmitter 78 and the transmitting station's receiver 56, to the transmitter 51, otherwise a "step-up" command is issued. The power control system is considered "closed-loop" because of the high-rate feedback of the "step-up" and "step-down" commands which can react in real time to the time-varying propagation channel and interference. If required transmit power level changes due to time varying interference and propagation, it quickly responds and adjusts transmit power accordingly.

With respect to the outer loop of the closed loop power control system, the quality of the received data is evaluated in the receiving station 70 by the measuring device 73. Typical metrics for digital data quality are bit error rate and block error rate. Computation of these metrics requires data accumulated over periods of time significantly longer than the period of the time-varying propagation channel and interference. For any given metric, there exists a theoretical relationship between the metric and received SIR. When enough data has been accumulated in the remote receiver to evaluate the metric, it is computed and compared with the desired metric (representing a desired quality of service) by the processor 74 and an updated target SIR is then output. The updated target SIR is that value (in theory) which applied in the receiver algorithm would cause the measured metric to converge to the desired value. The updated target SIR is then used in the inner loop to determine the direction of the step up/down commands sent to the transmitting station's power scale generating processor 55 to control the power of the transmitter 51.

In both open and closed power control systems, outer-loop functionality for the transmitting station 10, 50 relies on observations of received transmissions by the receiving station 30, 70 such as observing block-error rates (BLER) or received SIRs. If for example the BLER becomes higher than allowed, such as BLER>0.1 in 3GPP R5, and the user data becomes unusable because of too many errors, a higher target SIR is computed that causes the transmitting station 10, 50 in turn to adjust its transmit power. However, the time-shared nature of shared channels such as the HS-SICH in 3GPP R5 where a particular WTRU only transmits in the channel sporadically makes it very difficult to observe WTRU specific BLER or measured SIR with a frequency to assure consistent outer loop power control.

Figure 4:
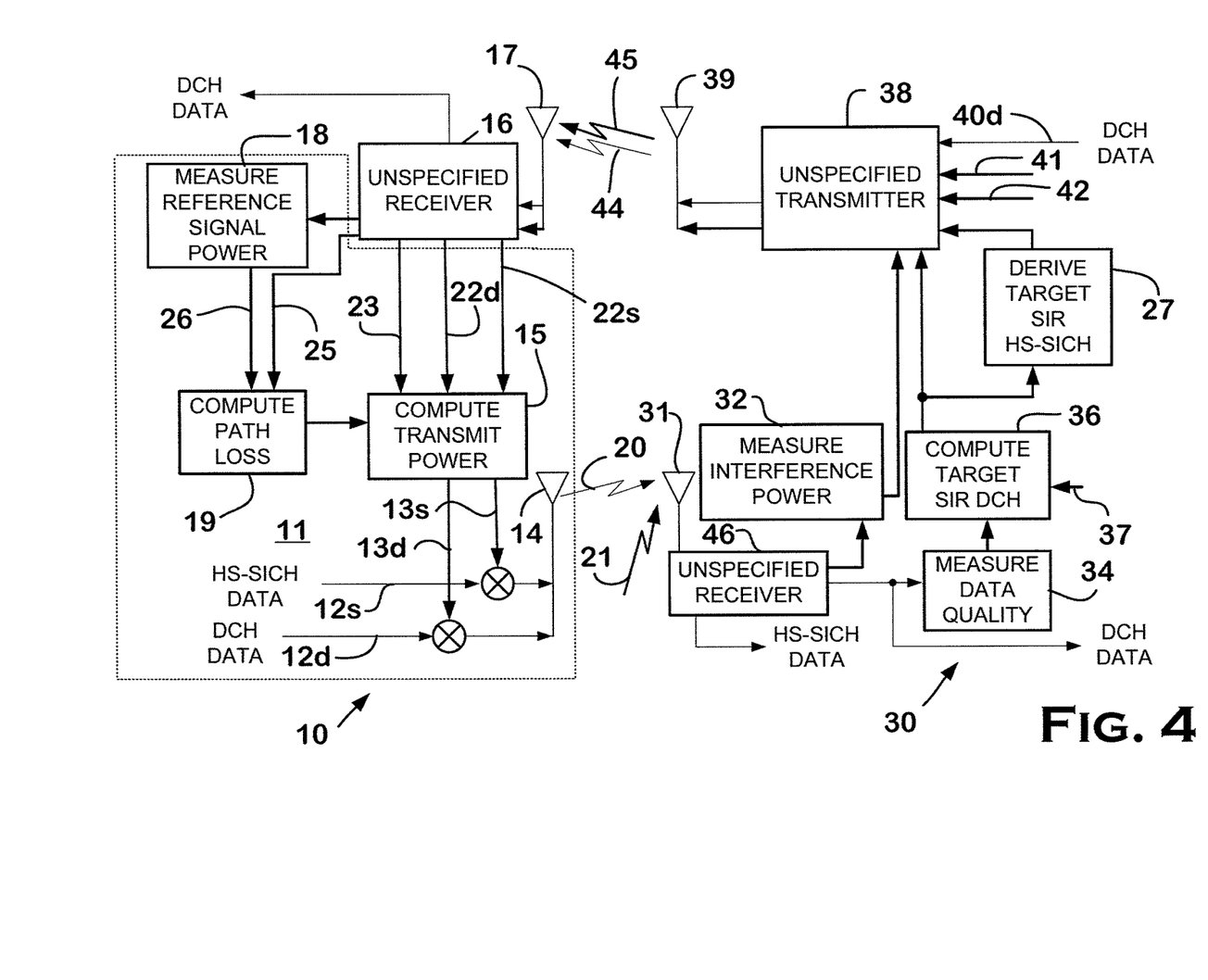
FIG. 4 is a schematic diagram of an open loop power control system for a wireless communication utilizing both a dedicated channel and a high speed shared channel made in accordance with the teaching of the present invention.
Figure 5:
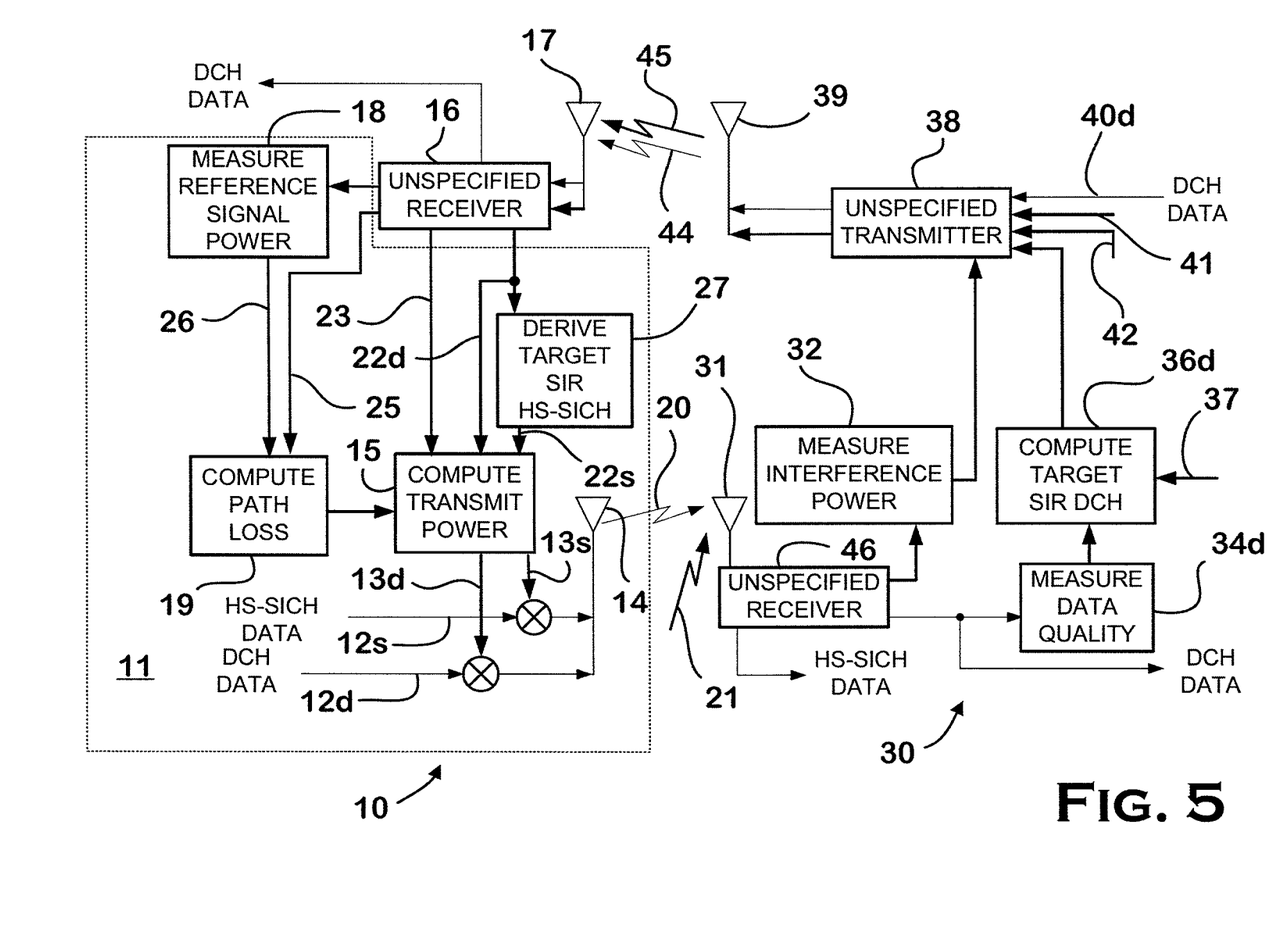
FIG. 5 is a schematic diagram of an alternate embodiment of a power control system for a wireless communication utilizing both a dedicated channel and a high speed shared channel made in accordance with the teaching of the present invention.
Figure 6:
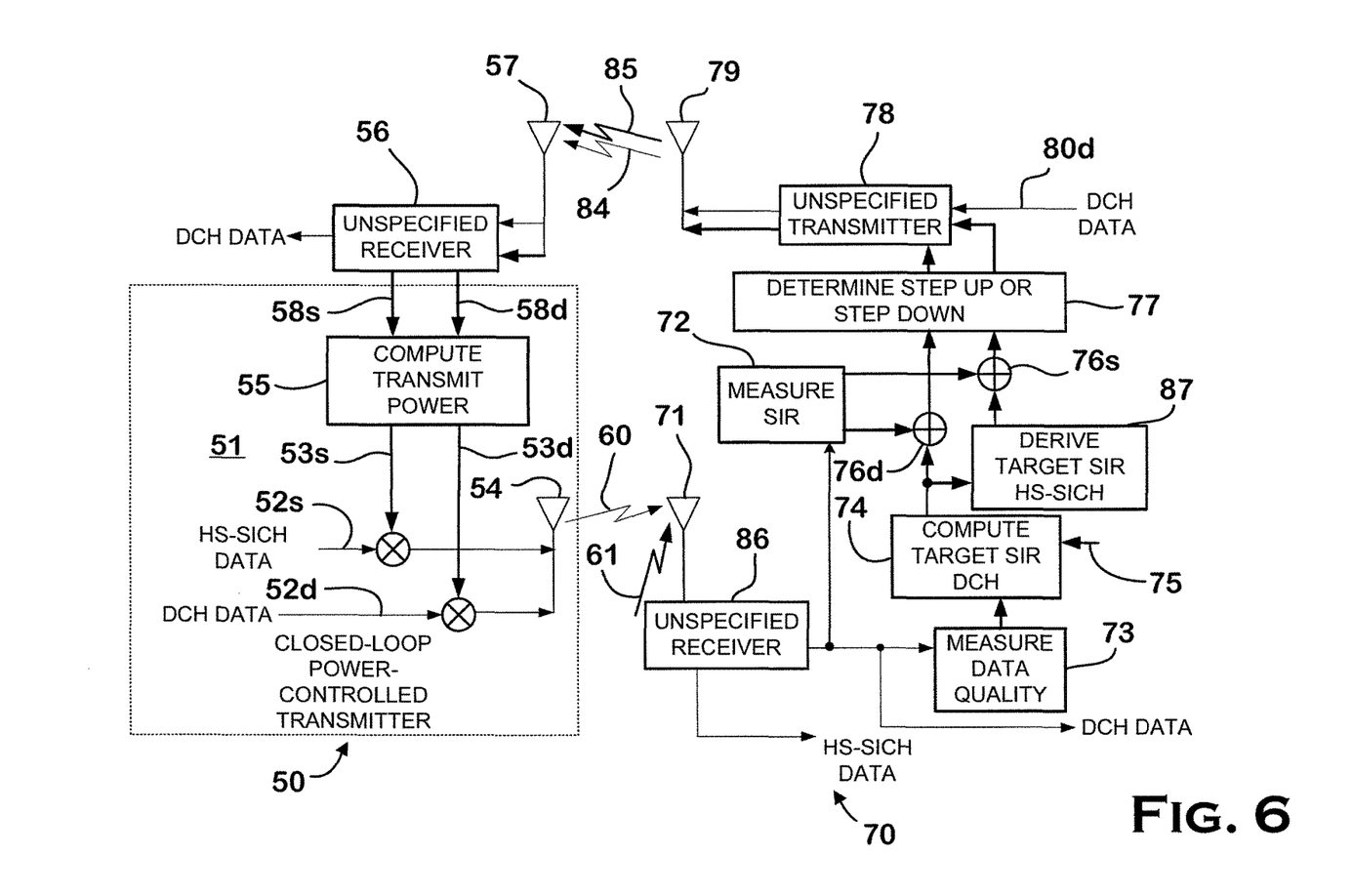
FIG. 6 is a schematic diagram of a closed loop power control system for a wireless communication utilizing both a dedicated channel and a high speed shared channel made in accordance with the teaching of the present invention.

With reference to FIGS. 4, 5 and 6, several modified variations of conventional power control system are illustrated that provides for outer-loop power control operation for a shared channel such as UL HS-SICH and an associated dedicated channel (DCH). These modified systems take advantage of the availability of more regular observations of the DCH. In order to set, a metric, such as a target SIR, for the shared channel, the target SIR for the associated DCH is used as a basis of derivation. For example, the target SIR for the HS-SICH for a particular WTRU is in accordance with the invention derived from the target SIR computed for the associated DCH. The derivation is preferably based on a predetermined mathematical relationship, which can in appropriate circumstances simply be equality, in which case the same computed SIR for the DCH is used for the HS-SICH power control. Alternatively, a mapping table based upon environments can be used to derive a target SIR on HS-SICH from the target SIR applied on the DCH. Accordingly, whenever the target SIR on the DCH is changed for a particular WTRU, the target SIR on the HS-SICH for that WTRU is updated accordingly in order to ensure reliable operation.

During HSDPA operation in a 3GPP R5 system, a WTRU is in a CELL_DCH state where it uses a relatively low-rate duplex DCH for the purpose of RRC signaling control and user-plane data. Every WTRU has such a low-rate DCH associated with the HS-SICH and on this DCH, outer loop power control is used to dynamically adjust the target SIR on DCH and the continuous usage (once every single or every second frame) of this DCH ensures that BLER and measured SIR for UL are meaningful. Even if HS-SICH and the UL portion of the DCH are potentially allocated in different UL TSs, the target SIR on the associated DCH is very heavily correlated with an a target SIR on HS-SICH, because it primarily depends on the WTRU channel environment and WTRU speed which is the same for both types of channels. Also, the UL interference levels, which can be different in different TSs, are already taken into account by other power control parameters that provide compensation therefor. Thus, the invention uses the target SIR on UL DCH that is accurately updated based upon a reliable Outer Loop Power Control functionality to set or to derive needed target SIR on UL HS-SICH for a particular WTRU.

The invention enables one to obtain accurate target SIRs from Outer Loop Power Control functionality that supervises DCH operation. By comparing the processing gain, payload and required BLER for the HS-SICH to that of the DCH, basic principles are applied to derive the recommended transmit power offset between the two channels. This derived offset can be performed either in the transmitting station or the receiving station, which in the case of a preferred 3GPP R5 embodiment for a HS-SICH correspond respectively to a UE and UTRAN, respectively.

FIGS. 4 and 5 illustrate modified open loop power control system for a wireless communication system made in accordance with the teaching of the present invention where like components that correspond to the conventional system shown in FIG. 2 are indicated with like reference numerals. For the example of an UL shared channel, such as the HS-SICH, the transceiver 10 is a WTRU and the component 30 represents a servicing network, such as a 3GPP R5 UTRAN.

In the case of the FIGS. 4 and 5 embodiments, the User Data path illustrated in FIG. 2, carries the data of the DCH which is associated with the shared channel. Data line 12 of FIG. 2, which transports user data for transmission from the WTRU, is identified as data line 12d in FIGS. 4 and 5 to signify the line for the UL data of the DCH. The UL DCH data signal is provided with a desired power level which is adjusted by applying a transmit power adjustment from an output 13d of a processor 15 to adjust the transmission power level. Data line 40 of FIG. 2, which transports user data for transmission to the WTRU, is identified as line 40d in FIGS. 4 and 5 to signify the line for the DL data of the DCH.

A data line 12s is provided to transport the UL data of the HS-SICH in the WTRU 10. The UL HS-SICH data signal is provided with a desired power level which is adjusted by applying a transmit power adjustment from an output 13s of a processor 15 to adjust the transmission power level. In the receiving station 30, a receiver 46 is provided to output the separate DCH and HS-SICH channels.

The power adjustment in the example WTRU 10, performed by the transmitter's processor 15 is preferably made in a conventional manner for each of the channels DCH and HS-SICH, respectively. In order to compute the respective transmit power adjustments, the processor 15 receives data from a respective target SIR data input 22d, 22s which carries the respective DCH and HS-SICH target SIR data, an interference power data input 23 which carries the interference data generated by the receiving station's interference power measuring device 32, and a path loss data input 24 which carries a path loss signal that is the output of the path loss computing circuitry 19.

The target SIR DCH is preferably generated in the conventional manner by evaluating the quality of the received DCH UL data via the measuring device 34. Typical metrics for digital data quality are bit error rate and block error rate. Computation of these metrics requires data accumulated over periods of time significantly longer than the period of the time-varying propagation channel and interference. For any given metric, there exists a theoretical relationship between the metric and received SIR. When enough data has been accumulated in the remote receiver to evaluate the metric, it is computed in processor 36 and compared with the desired metric (representing a desired quality of service) provided by input 37 and an updated target SIR DCH is then output. The updated target SIR DCH is that value (in theory) which applied in the transmitter inner loop would cause the measured metric to converge to the desired value. Finally, the updated target SIR DCH is passed, via the receiving station transmitter 38 and the transmitting station receiver 16, to the transmitter 11 for use in its inner loop for the DCH. The update rate of target SIR DCH is bounded by the time required to accumulate the quality statistic and practical limits on the signaling rate to the power-controlled transmitter.

Due to the sporadic and shared use nature of the HS-SICH, attempting to compute a target SIR for the HS-SICH in the conventional manner is impractical. Accordingly, the outer loop power control for the HS-SICH includes a HS-SICH target SIR derivation device 27 to which the target SIR DCH is input and from which the target SIR HS-SICH is output. The HS-SICH target SIR derivation device 27 preferably sets the relationship between target SIR on DCH and target SIR on HS-SICH either as 1:1 or any other predefined mathematical relationship, or as taken from a mapping table.

FIG. 4 illustrates a preferred embodiment where the HS-SICH target SIR derivation device 27 is included in the receiving station 30. Where the invention is implemented in a UMTS system, the transmitting station 10 preferably represents a WTRU and the receiving station 30 preferably represents network components of a UTRAN. The target SIR HS-SICH is then derived in the UTRAN and passed, via the UTRAN's transmitter 38 and the WTRU's receiver 16, to the WTRU's transmitter's processor 15 via the input 22s for use in the inner loop for the HS-SICH.

FIG. 5 illustrates an alternate embodiment where the HS-SICH target SIR derivation device 27 is included in the transmitting station 10. In that case, the target SIR DCH that is passed, via the receiving station transmitter 38 and the WTRU's receiver 16, and fed to the derivation device 27 in the WTRU's transmitter 11, which in turn derives the HS-SICH target SIR and feeds it to the processor 15 via the input 22s for use in the inner loop for the HS-SICH.

FIG. 6 illustrates a modified closed loop power control system for a wireless communication system made in accordance with the teaching of the present invention where like components that correspond to the conventional system shown in FIG. 3 are indicated with like reference numerals. For the example of an UL shared channel, such as the HS-SICH, the transceiver 50 is a WTRU and the component 70 represents a servicing network, such as a 3GPP R5 UTRAN.

In the case of the FIG. 6 embodiment, the User Data path illustrated in FIG. 3 carries the data of the DCH, which is associated with the shared channel. Data line 52 of FIG. 3, which transports user data for transmission from the WTRU, is identified as line 52d in FIG. 6 to signify the line for the UL data of the DCH. The UL DCH data signal is provided with a desired power level which is adjusted by applying a transmit power adjustment from an output 53d of a processor 55 to adjust the transmission power level. Data line 80 of FIG. 3, which transports user data for transmission to the WTRU, is identified as line 80d in FIG. 6 to signify the line for the DL data of the DCH.

In the FIG. 6 embodiment, a data line 52s is provided to transport the UL data of the HS-SICH in the WTRU 10. The UL HS-SICH data signal is provided with a desired power level, which is adjusted by applying a transmit power adjustment from an output 53s of a processor 55 to adjust the transmission power level. In the receiving station 70, a receiver 86 is provided to output the separate DCH and HS-SICH channels. Where the invention is implemented in a UMTS system, the transmitting station 50 preferably represents a WTRU and the receiving station 70 preferably represents network components of a UTRAN.

The power adjustment in the example WTRU 50 performed by the transmitter's processor 55 is preferably made in a conventional manner for each of the channels DCH and HS-SICH, respectively. In order to compute the respective transmit power adjustments, the processor 15 receives respective up/down command signals through inputs 58d and 58s and computes the respective transmit power adjustments based thereon.

With respect to the inner loop of the closed loop power control system, the transmitting station's transmitter 51 sets its power based upon high-rate "step-up" and "step-down" commands generated by the receiving station 70. At the receiving station 70, the SIR of the received DCH data is measured by the measuring device 72 and compared with a target SIR DCH value generated by the processor 74 via combiner 76d. If the measured received SIR DCH is less than the target SIR DCH, a DCH "step-down" command is issued and passed by the processing circuitry 77, via the receiving station's transmitter 78 and the transmitting station's receiver 56, to the transmitter 51 via input 58d, otherwise a DCH "step-up" command is issued. The power control system is considered "closed-loop" because of the high-rate feedback of the "step-up" and "step-down" commands which can react in real time to the time-varying propagation channel and interference. If required transmit power level changes due to time varying interference and propagation, it quickly responds and adjusts transmit power accordingly.

With respect to the outer loop of the closed loop power control system of FIG. 6, the quality of the received DCH data is evaluated in the receiving station 70 by the measuring device 73. Typical metrics for digital data quality are bit error rate and BLER. Computation of these metrics requires data accumulated over periods of time significantly longer than the period of the time-varying propagation channel and interference. For any given metric, there exists a theoretical relationship between the metric and received SIR DCH. When enough data has been accumulated in the remote receiver to evaluate the metric, it is computed and compared with the desired metric (representing a desired quality of service) by the processor 74 and an updated target SIR DCH is then output. The updated target SIR DCH is then used in the inner loop to determine the direction of the DCH step up/down commands sent to the transmitting station's power adjustment generating processor 55 to control the power of the transmitter 51.

Due to the sporadic and shared use nature of the HS-SICH, attempting to compute a target SIR for the HS-SICH in the conventional manner is impractical. Accordingly, FIG. 6 illustrates a preferred embodiment where the outer loop power control for the HS-SICH includes a HS-SICH target SIR derivation device 87 to which the target SIR DCH is input and from which the target SIR HS-SICH is output. The HS-SICH target SIR derivation device 27 preferably sets the relationship between target SIR on DCH and target SIR on HS-SICH either as 1:1 or any other predefined mathematical relationship, or as taken from a mapping table. The target SIR HS-SICH value generated by the device 87 is and compared via combiner 76s with SIR of the received DCH data is measured by the measuring device 72 or a derivative thereof. Alternatively, the SIR of the received HS-SICH is measured and compared with the target SIR HS-SICH. If the compared value is less than the target SIR HS-SICH, a HS-SICH "step-down" command is issued and passed by the processing circuitry 77, via the receiving station's transmitter 78 and the transmitting station's receiver 56, to the transmitter 51 via input 58s, otherwise a HS-SICH "step-up" command is issued.

Thus, as described above, reliable Outer Loop Power Control functionality on HS-SICH is achieved for radio resource usage efficiency in HSDPA for UTRA TDD. The invention thus provides a new relationship between target SIR settings on DCH and HS-SICH for particular WTRUs and all usages thereof.

The foregoing description makes references to HSDPA in UTRA TDD as an example only and not as a limitation. The invention is applicable to other systems of wireless communication including dedicated and shared channels. Other variations and modifications consistent with the invention will be recognized by those of ordinary skill in the art.

What is claimed is:

1. A first wireless transmit/receive unit (WTRU) comprising:
   a receiver configured to receive a control signal from a base station;
   the receiver configured to receive a transmit power command from the base station; and
   a transmitter operatively coupled to the receiver, the transmitter configured to directly transmit a shared channel signal to a second WTRU in a first transmission time interval (TTI) based on the received control signal, wherein a transmission power level of the transmitted shared channel signal is based on the received transmit power command.

2. The first WTRU of claim 1, wherein the receiver is further configured to receive user data from the base station.

3. The first WTRU of claim 1, wherein the transmitted shared channel signal contains user data.

4. The first WTRU of claim 1, wherein the transmission power level is further based on a measured pathloss.

5. The first WTRU of claim 4, wherein the measured pathloss is derived from a received power level of a reference signal and a transmission power level of the reference signal.

6. The first WTRU of claim 1, wherein the transmitter is further configured to directly transmit a second channel signal to the second WTRU in a second TTI, wherein a transmission power level of the transmitted second channel signal is derived from a measured pathloss and a received transmit power command.

7. The first WTRU of claim 6, wherein the second channel signal contains a second control signal.

8. A method for use in a first wireless transmit/receive unit (WTRU), the method comprising:
   receiving a control signal from a base station;
   receiving a transmit power command from the base station; and
   directly transmitting a shared channel signal to a second WTRU in a first transmission time interval (TTI) based on the received control signal, wherein a transmission power level of the transmitted shared channel signal is based on the received transmit power command.

9. The method of claim 8, further comprising:
   receiving user data from the base station.

10. The method of claim 8, wherein the transmitted shared channel signal contains user data.

11. The method of claim 8, wherein the transmission power level is further based on a measured pathloss.

12. The method of claim 11, wherein the measured pathloss is derived from a received power level of a reference signal and a transmission power level of the reference signal.

13. The method of claim 8, further comprising:
    directly transmitting a second channel signal to the second WTRU in a second TTI, wherein a transmission power level of the transmitted second channel signal is derived from a measured pathloss and a received transmit power command.

14. The method of claim 13, wherein the second channel signal contains a second control signal.

15. The first WTRU of claim 6, wherein the first TTI is the same TTI as the second TTI.

16. The method of claim 13, wherein the first TTI is the same TTI as the second TTI.

17. A subscriber apparatus comprising:
    a receiver configured to receive transmit power control information from a base station;
    the receiver configured to receive a control signal from the base station; and
    a transmitter operatively coupled to the receiver, the transmitter configured to directly transmit a shared channel signal to a second subscriber apparatus in a first transmission time interval (TTI) based on the received control signal, wherein a transmission power level of the transmitted shared channel signal is based on the received transmit power control information.

18. The subscriber apparatus of claim 17, wherein the transmission power level is further based on a measured pathloss.

19. The subscriber apparatus of claim 18, wherein the measured pathloss is derived from a received power level of a reference signal and a transmission power level of the reference signal.

20. The subscriber apparatus of claim 17, wherein the transmitter is further configured to directly transmit a second channel signal to the second subscriber apparatus in a second TTI, wherein a transmission power level of the transmitted second channel signal is derived from a measured pathloss and received transmit power control information.

\* \* \* \* \*